United States Patent
Sonobe et al.

(10) Patent No.: US 12,333,848 B2
(45) Date of Patent: Jun. 17, 2025

(54) INFORMATION PROCESSING SYSTEM, INFORMATION PROCESSING APPARATUS, INFORMATION PROCESSING METHOD, AND RECORDING MEDIUM

(71) Applicant: NEC Corporation, Tokyo (JP)

(72) Inventors: Takaaki Sonobe, Tokyo (JP); Akira Hirokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/697,055

(22) PCT Filed: Oct. 4, 2021

(86) PCT No.: PCT/JP2021/036650
§ 371 (c)(1),
(2) Date: Mar. 29, 2024

(87) PCT Pub. No.: WO2023/058091
PCT Pub. Date: Apr. 13, 2023

(65) Prior Publication Data
US 2024/0404316 A1 Dec. 5, 2024

(51) Int. Cl.
*G06V 40/12* (2022.01)
*G06V 10/774* (2022.01)

(52) U.S. Cl.
CPC ........ *G06V 40/1359* (2022.01); *G06V 10/774* (2022.01)

(58) Field of Classification Search
CPC ... G06V 40/1359; G06V 10/774; G06V 10/70
See application file for complete search history.

(56) References Cited

U.S. PATENT DOCUMENTS 11,776,302 B2* 10/2023 Shimahara .......... G06F 18/2115
382/124
2009/0245597 A1 10/2009 Toyama
(Continued)

FOREIGN PATENT DOCUMENTS

| JP | 2009-237941 A | 10/2009 |
| JP | 2018-165911 A | 10/2018 |

OTHER PUBLICATIONS

International Search Report for PCT Application No. PCT/JP2021/036650, mailed on Nov. 9, 2021.

*Primary Examiner* — Lixi C Simpson
(74) *Attorney, Agent, or Firm* — Sughrue Mion, PLLC

(57) ABSTRACT

An information processing system includes: a storage unit that stores first area information indicating a clear zone in which a feature quantity of a ridge in a ridge image can be extracted, and second area information indicating an unclear zone that is an area other than the clear zone, in association with each of a plurality of ridge images; an extraction unit that extracts third area information indicating the clear zone, and fourth area information indicating the unclear zone, from the ridge image; a calculation unit that calculates a first score based on the first area information and the second area information, and a second score based on the third area information and the fourth area information; and a selection unit that selects the ridge image to be used for machine learning of the extraction unit, on the basis of the first score and the second score.

9 Claims, 14 Drawing Sheets

(56) References Cited

U.S. PATENT DOCUMENTS

2018/0025199 A1* 1/2018 Ryshtun ............. G06V 40/1376
                                                     382/125
2021/0397813 A1* 12/2021 Lee .................... G06V 40/1318
2023/0030937 A1*  2/2023 Lee ........................ G06V 10/30

* cited by examiner

SCORE: 4

SCORE: 2

FIG. 7A ZONE INFORMATION AUTOMATICALLY EXTRACTED
SCORE: 3229
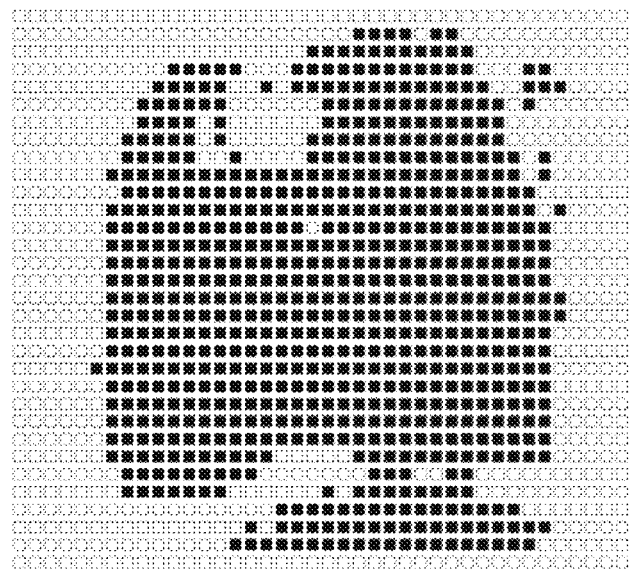
FIG. 7B ZONE INFORMATION AFTER CORRECTION WORK
SCORE: 2776
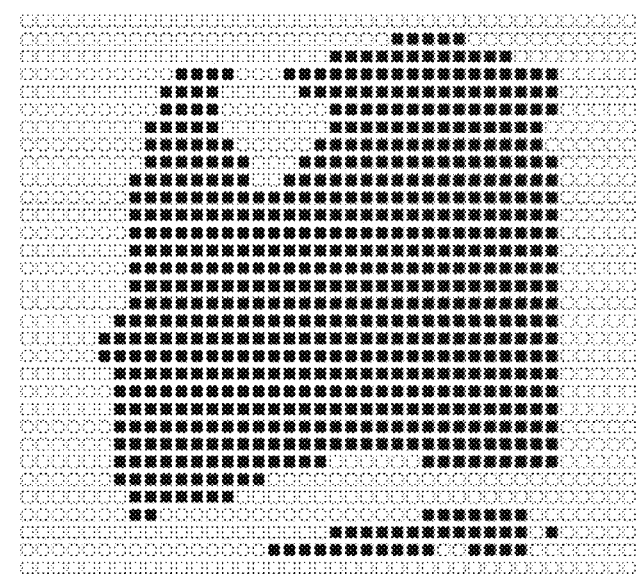

COUNTED AS island

NOT COUNTED AS island

FIG. 9A ZONE INFORMATION AUTOMATICALLY EXTRACTED
SCORE: 2
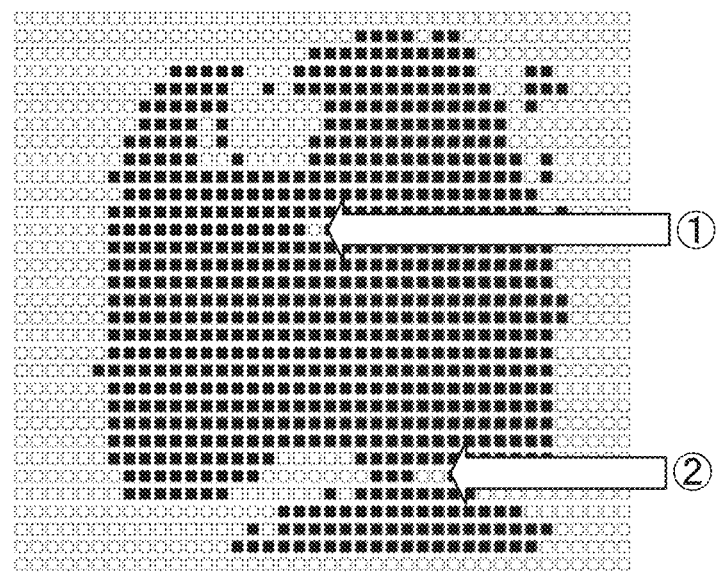
FIG. 9B ZONE INFORMATION AFTER CORRECTION WORK
SCORE: 0
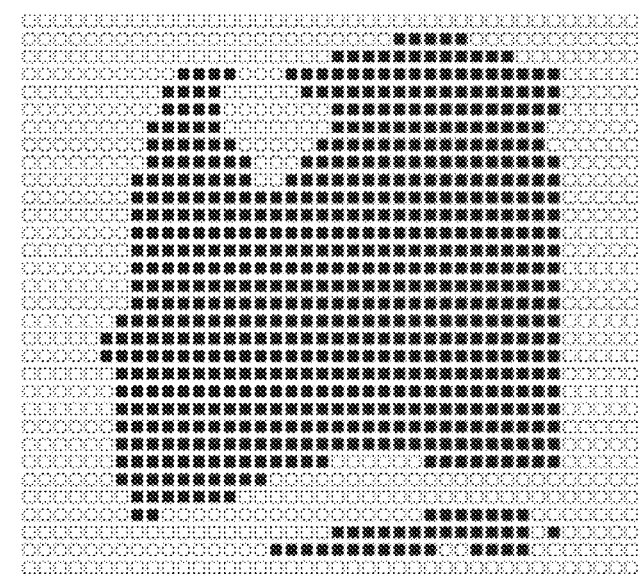

|  | CHANGE ALGORITHM | CHANGE WEIGHT |
|---|---|---|
| FINGERPRINT | 「edge count」 OR 「island count」 | INCREASE WEIGHTS OF 「island count」 「edge count」 OR REDUCE WEIGHT OF 「BINARY SMOOTH」 |
| PALM PRINT | 「BINARY SMOOTH」 | INCREASE WEIGHT OF 「BINARY SMOOTH」 OR REDUCE WEIGHTS OF 「island count」 「edge count」 |

FIG. 14

INFORMATION PROCESSING SYSTEM, INFORMATION PROCESSING APPARATUS, INFORMATION PROCESSING METHOD, AND RECORDING MEDIUM

This application is a National Stage Entry of PCT/JP2021/036650 filed on Oct. 4, 2021, the contents of all of which are incorporated herein by reference, in their entirety.

TECHNICAL FIELD

This disclosure relates to technical fields of an information processing system, an information processing apparatus, an information processing method, and a recording medium.

BACKGROUND ART

A known system of this type deals with information about ridges of a living body (e.g., lines that constitute a fingerprint or a palm print). Patent Literature 1 discloses a technique/technology of automatically extracting a ridge area in an image, on the basis of a correlation value indicating similarity with a plurality of ridge template images. Patent Literature 2 discloses a method of classifying an area of a fingerprint image, by using a model learned by machine learning.

CITATION LIST

Patent Literature

Patent Literature 1: JP2009-237941A
Patent Literature 2: JP2018-165911A

SUMMARY

Technical Problem

This disclosure aims to improve the techniques/technologies disclosed in Citation List.

Solution to Problem

An information processing system according to an example aspect of this disclosure includes: a storage unit that stores first area information indicating a clear zone in which a feature quantity of a ridge in a ridge image can be extracted, and second area information indicating an unclear zone that is an area other than the clear zone, in association with each of a plurality of ridge images; an extraction unit that extracts third area information indicating the clear zone, and fourth area information indicating the unclear zone, from the ridge image; a calculation unit that calculates a first score based on the first area information and the second area information, and a second score based on the third area information and the fourth area information; and a selection unit that selects the ridge image to be used for machine learning of the extraction unit, on the basis of the first score and the second score.

An information processing apparatus according to an example aspect of this disclosure includes: a storage unit that stores first area information indicating a clear zone in which a feature quantity of a ridge in a ridge image can be extracted, and second area information indicating an unclear zone that is an area other than the clear zone, in association with each of a plurality of ridge images; an extraction unit that extracts third area information indicating the clear zone, and fourth area information indicating the unclear zone, from the ridge image; a calculation unit that calculates a first score based on the first area information and the second area information, and a second score based on the third area information and the fourth area information; and a selection unit that selects the ridge image to be used for machine learning of the extraction unit, on the basis of the first score and the second score.

An information processing method according to an example aspect of this disclosure includes: storing first area information indicating a clear zone in which a feature quantity of a ridge in a ridge image can be extracted, and second area information indicating an unclear zone that is an area other than the clear zone, in association with each of a plurality of ridge images; extracting third area information indicating the clear zone, and fourth area information indicating the unclear zone, from the ridge image; calculating a first score based on the first area information and the second area information, and a second score based on the third area information and the fourth area information; and selecting the ridge image to be used for machine learning of the extraction unit, on the basis of the first score and the second score.

A recording medium according to an example aspect of this disclosure is a recording medium on which a computer program that allows at least one computer to execute an information processing method is recorded, the information processing method including: storing first area information indicating a clear zone in which a feature quantity of a ridge in a ridge image can be extracted, and second area information indicating an unclear zone that is an area other than the clear zone, in association with each of a plurality of ridge images; extracting third area information indicating the clear zone, and fourth area information indicating the unclear zone, from the ridge image; calculating a first score based on the first area information and the second area information, and a second score based on the third area information and the fourth area information; and selecting the ridge image to be used for machine learning of the extraction unit, on the basis of the first score and the second score.

BRIEF DESCRIPTION OF DRAWINGS

FIG. 7A and FIG. 7B are plan views illustrating a score calculation example by the information processing system according to the second example embodiment.

FIG. 9A and FIG. 9B are plan views illustrating a score calculation example by the information processing system according to the third example embodiment.

FIG. 14 is a table illustrating an operation example of the information processing system according to the seventh example embodiment.

Hereinafter, an information processing system, an information processing method, and a recording medium according to example embodiments will be described with reference to the drawings.

First Example Embodiment

An information processing system according to a first example embodiment will be described with reference to FIG. 1 to FIG. 5.
(Hardware Configuration)

Figure 1:
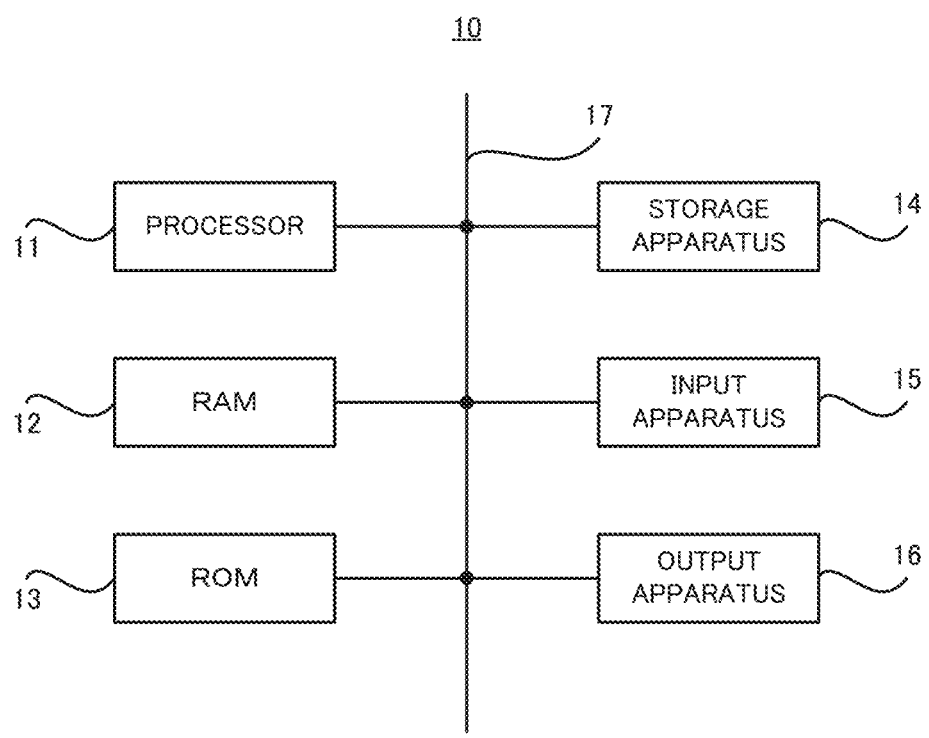
FIG. 1 is a block diagram illustrating a hardware configuration of an information processing system according to a first example embodiment.

First, a hardware configuration of the information processing system according to the first example embodiment will be described with reference to FIG. 1. FIG. 1 is a block diagram illustrating the hardware configuration of the information processing system according to the first example embodiment.

As illustrated in FIG. 1, an information processing system 10 according to the first example embodiment includes a processor 11, a RAM (Random Access Memory) 12, a ROM (Read Only Memory) 13, and a storage apparatus 14. The information processing system 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium by using a not-illustrated recording medium reading apparatus. The processor 11 may acquire (i.e., may read) a computer program from a not-illustrated apparatus disposed outside the information processing system 10, through a network interface. The processor 11 controls he RAM 12, the storage apparatus 14, the input apparatus 15, and the output apparatus 16 by executing the read computer program. Especially in this example embodiment, when the processor 11 executes the read computer program, a functional block for performing a process associated with learning using a ridge image, is realized or implemented in the processor 11. That is, the processor 11 may function as a controller for executing each control of the information processing system 10.

The processor 11 may be configured as, for example, a CPU (Central Processing Unit), a GPU (Graphics Processing Unit), a FPGA (field-programmable gate array), a DSP (Demand-Side Platform) or an ASIC (Application Specific Integrated Circuit). The processor 11 may be one of them, or may use a plurality of them in parallel.

The RAM 12 temporarily stores the computer program to be executed by the processor 11. The RAM 12 temporarily stores the data that are temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that are stored for a long term by the information processing system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing system 10. The input apparatus 15 may include, for example, at least one of a keyboard, a mouse, and a touch panel. The input apparatus 15 may be configured as a portable terminal such as a smartphone and a tablet.

The output apparatus 16 is an apparatus that outputs information about the information processing system 10 to the outside. For example, the output apparatus 16 may be a display apparatus (e.g., a display) that is configured to display the information about the information processing system 10. The output apparatus 16 may be a speaker or the like that is configured to audio-output the information about the information processing system 10. The output apparatus 16 may be configured as a portable terminal such as a smartphone and a tablet.

Although FIG. 1 illustrates the information processing system 10 including a plurality of apparatuses, all or a part of the functions thereof may be realized in a single apparatus (information processing apparatus). The information processing apparatus may include only the processor 11, the RAM 12, and the ROM 13, for example, and an external apparatus connected to the information processing apparatus may include the other components (i.e., the storage apparatus 14, the input apparatus 15, and the output apparatus 16), for example. In the information processing apparatus, a part of an arithmetic function may also be realized by an external apparatus (e.g., an external server or cloud).
(Functional Configuration)

Figure 2:
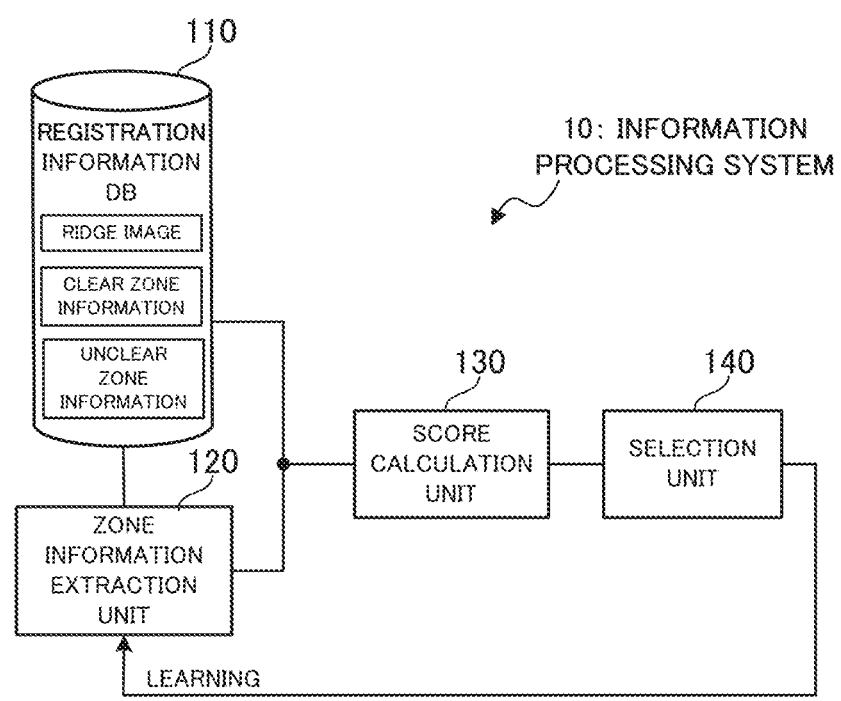
FIG. 2 is a block diagram illustrating a functional configuration of the information processing system according to the first example embodiment.

Next, a functional configuration of the information processing system 10 according to the first example embodiment will be described with reference to FIG. 2. FIG. 2 is a block diagram illustrating the functional configuration of the information processing system according to the first example embodiment.

As illustrated in FIG. 2, the information processing system 10 according to the first example embodiment includes, as components for realizing the functions thereof, a registration information database (DB) 110, a zone information extraction unit 120, a score calculation unit 130, and a selection unit 140. The registration information database may be configured by the storage apparatus 14 (see FIG. 1), for example. Each of the zone information extraction unit 120, the score calculation unit 130, and the selection unit 140 may be a processing block realized or implemented by the processor 11 (see FIG. 1), for example.

The registration information database 110 is configured to store a plurality of ridge images. The ridge image is an image including ridges of a living body, and may include a fingerprint image or a palm print image, for example. Furthermore, the registration information database 110 is configured to store clear zone information and unclear zone information in association with each of the plurality of ridge images. The clear zone information is information indicating an area (a clear zone) in which a feature quantity of a ridge in the ridge image can be extracted. The unclear zone information is information indicating an area other than the clear zone in the ridge image (i.e., an area in which the feature quantity of the ridge in the ridge image cannot be extracted). The clear zone information and the unclear zone information may be information indicating in which part of the ridge image the clear zone and an unclear zone are (e.g., position information about the clear zone and the unclear zone). The clear zone information and the unclear zone information may be set for each pixel, or may be set for each area including a plurality of pixels, for example. The clear zone and the unclear zone will be described later in detail with a specific example.

The zone information extraction unit 120 is configured to extract the clear zone information and the unclear zone information from the ridge image stored in the registration information database 110. The zone information extraction unit 120 may be configured to extract the clear zone information and the unclear zone by using a previously machine-learned model. The clear zone information and the unclear zone information extracted by the zone information extraction unit 120 (hereinafter referred to as "extraction zone information" as appropriate) may be the same as or different from the clear zone information and the unclear zone information stored in the registration information database 110 (hereinafter referred to as "registration zone information" as appropriate). For example, in a case where the clear zone information and the unclear zone information extracted by the zone information extraction unit 120 are registered without change in the registration information database 110, the extraction zone information is the same as the registration zone information. On the other hand, in a case where the clear zone information and the unclear zone information extracted by the zone information extraction unit 120 are partially corrected and then registered, for example, the extraction zone information is different from the registration zone information. The correction of the zone information and the unclear zone information will be described in detail later.

The score calculation unit 130 is configured to calculate a first score on the basis of the registration zone information stored in the registration information database 110. Furthermore, the score calculation unit 130 is configured to calculate a second score on the basis of the extraction zone information extracted by the zone information extraction unit 120. The first score and the second score are scores for calculating to what extent the registration zone information and the extraction zone information are suitable for machine learning.

The selection unit 140 is configured to select the ridge image to be used for machine learning of the zone information extraction unit 120, on the basis of the first score and the second score calculated by the score calculation unit 130. For example, the selection unit 140 may compare the first score and the second score with each other, and may select an image with a big difference (e.g., an image in which the difference is greater than or equal to a predetermined threshold), as the ridge image to be used for machine learning. The predetermined threshold in this case may be determined and set as an appropriate value in advance. The predetermined threshold may be configured to be manually changed. For example, the predetermined threshold may be lowered in a case where learning is desired to be performed by using more ridge images, and the predetermined threshold may be raised in a case where learning is desired to be performed by using only an image that is more suitable for learning. The selection unit 140 may output the clear zone information and unclear zone information stored in association with the selected ridge image (i.e., the registration zone information), as data to be used for machine learning.

The learning using the ridge image selected by the selection unit 140 (i.e., the learning of the zone information extraction unit 120) may be performed by a learning unit outside the system; however, the information processing system 10 according to this example embodiment may include the learning unit. The learning by the learning unit may be performed periodically, or may be performed in accordance with a user's operation. For example, a button "re-learning" may be displayed on a management screen of the system, and the learning may be performed at timing when the user presses the button.

(Clear Zone and Unclear Zone)

Figure 3:
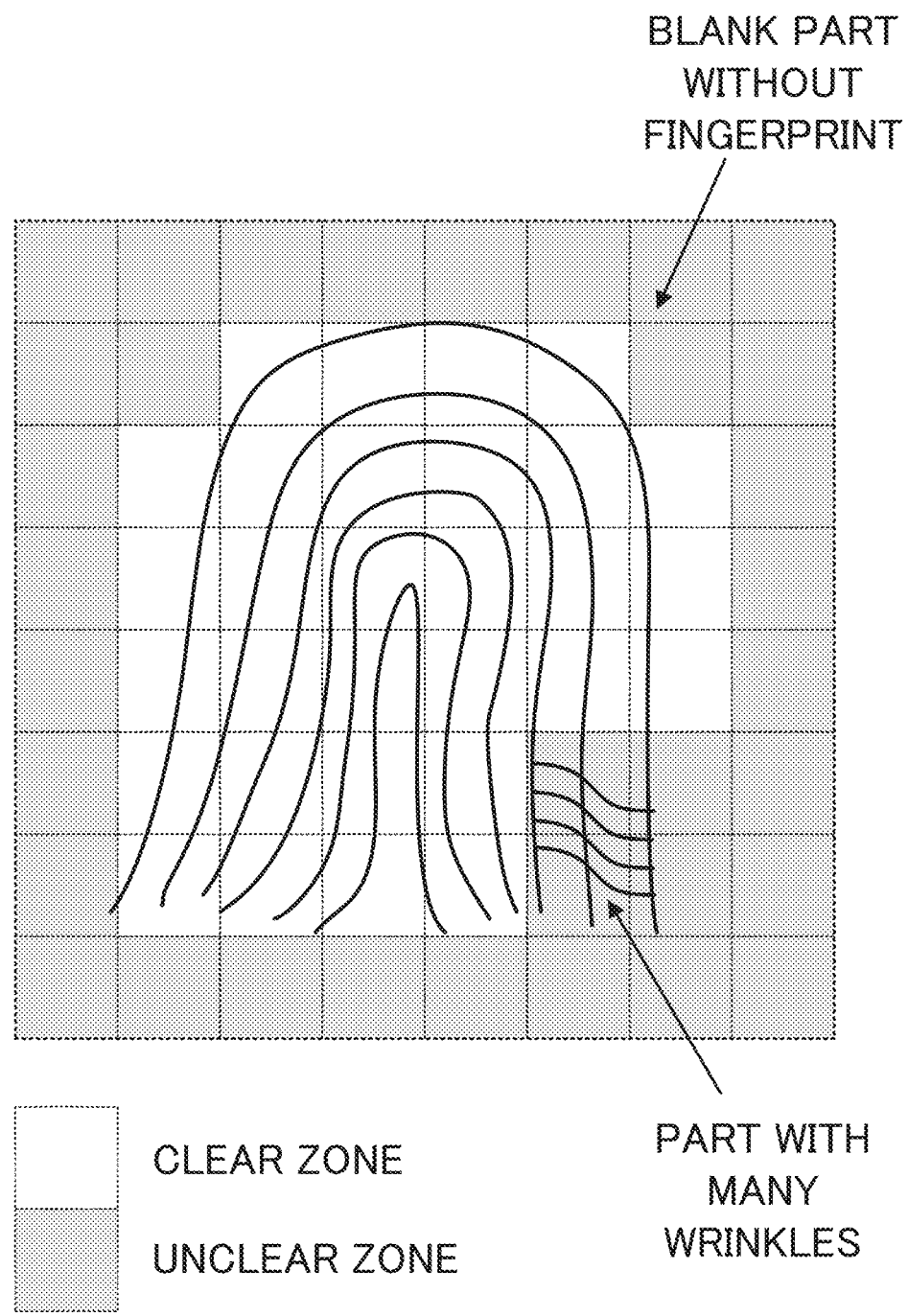
FIG. 3 is a plan view illustrating an example of a clear zone and an unclear zone in a ridge image.

Next, the clear zone and the unclear zone in the ridge image will be specifically described with reference to FIG. 3. FIG. 3 is a plan view illustrating an example of the clear zone and the unclear zone in the ridge image. FIG. 3 illustrates a fingerprint image as an example of the ridge image.

As illustrated in FIG. 3, an area that includes ridges may be set as the clear zone in the ridge image. From the clear zone set in this way, it is possible to properly extract the feature quantity about the ridge. On the other hand, an area that does not include ridges may be set as the unclear zone in the ridge image. In addition, an area that includes ridges, but in which the feature quantity thereof is hardly extracted (e.g., an area with many wrinkles illustrated in FIG. 3), may be set as the unclear zone. The zone information extraction unit 120 is to be learned to properly determine the clear zone and the unclear zone.

Here, the method of setting the clear zone and the unclear zone is merely an example, and the clear zone and the unclear zone may be set in a different logic. Furthermore, the clear zone and the unclear zone may be properly corrected by a human hand, as described in the following registration operation. For example, an area that is determined to be the clear zone by the zone information extraction unit 120 may be changed to the unclear zone by a human hand. Similarly, an area that is determined t be the unclear zone by the zone information extraction unit 120 may be changed to the clear zone by a human hand.

(Registration Operation)

Figure 4:
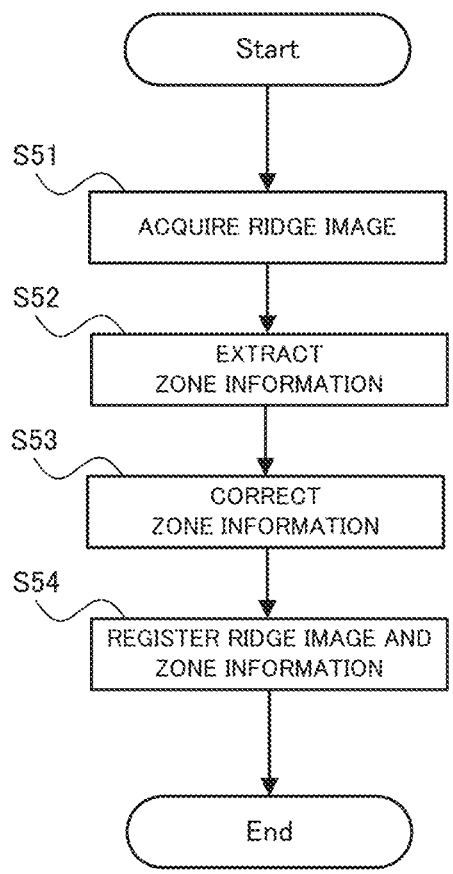
FIG. 4 is a flowchart illustrating a flow of a registration operation in the information processing system according to the first example embodiment.

Next, with reference to FIG. 4, a flow of an operation when the ridge image, the clear zone information, and the unclear zone information are registered in the registration information database 110 in the information processing system 10 according to the first example embodiment (hereinafter referred to as a "registration operation" as appropriate) will be described. FIG. 4 is a flowchart illustrating the flow of the registration operation by the information processing system according to the first example embodiment.

As illustrated in FIG. 4, when the information processing system 10 according to the first example embodiment performs the registration operation, first, the ridge image is acquired (step S51). The ridge image may be acquired by using a camera, a scanner, or the like, for example. Thereafter, the zone information extraction unit 120 extracts the clear zone information and the unclear zone information from the acquired ridge image (step S52). That is, the clear zone and the unclear zone in the ridge image are determined. At this time, information about a setting value of the zone information extraction unit 120 (e.g., image brightness, contrast, or the like) may be stored in the registration information database 110. The stored information about the setting value may be outputted as an element used for learning, together with the clear zone information and the unclear zone information, for example.

Next, the clear zone information and the unclear zone information are corrected by a human hand (step S53). For example, in a case where an area is determined to be the clear zone by the zone information extraction unit 120, but can be determined to be the unclear zone when viewed by human eyes, the clear zone may be changed to the unclear zone. Similarly, in a case where an area is determined to be the unclear zone by the zone information extraction unit 120, but can be determined to be the unclear zone when viewed by human eyes, the unclear zone may be changed to the clear zone. The registration information database 110 may store information about a history of the correction performed in the step S53. For example, it may store a position of an area in which the unclear zone is changed to the unclear zone, and a position of an area in which the unclear zone is changed to the clear zone. The information about the history of the correction may be outputted as an element used for learning, together with the clear zone information and the unclear zone information, for example.

Subsequently, the acquired ridge image, and the clear zone information and the unclear zone information extracted from the ridge image, are registered in the registration information database 110 (step S54). The correction of the clear zone information and the unclear zone information described above may not necessarily be performed before the registration. That is, the step S53 may be omitted as appropriate. For example, in a case where it can be determined that there is no area to be corrected, the registration may be performed without correction. Furthermore, in a case where a worker who performs this correction work cannot immediately spare time, information extracted without correction may be registered as it is. As a result, the clear zone information and the unclear zone information registered in the registration information database 110 are a mixture of information that is corrected by a human hand and information that is not corrected. In addition, since a correction amount and correction quality depend on a degree of skill of the worker who performs the correction work, or the like, all of the clear zone information and the unclear zone information, even after correction, are not necessarily properly corrected (in other words, are not necessarily suitable for learning).

(Selection Operation)

Figure 5:
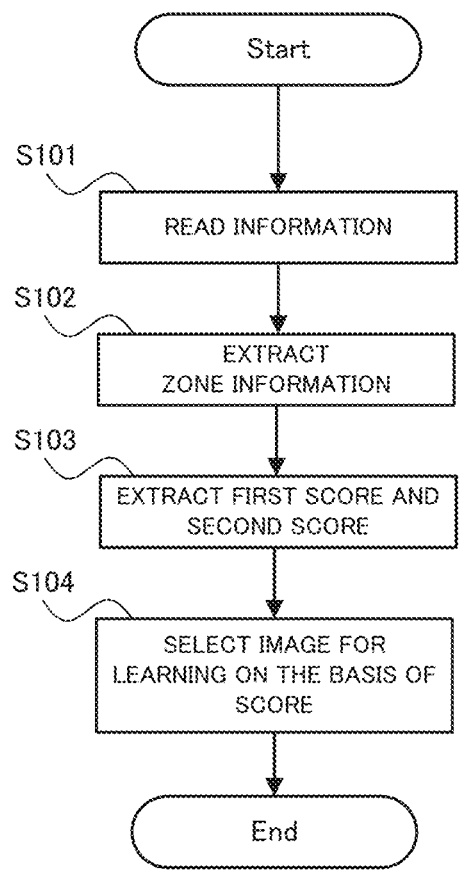
FIG. 5 is a flowchart illustrating a flow of a selection operation in the information processing system according to the first example embodiment.

Next, with reference to FIG. 5, a flow of an operation when the image to be used for machine learning of the zone information extraction unit 120 in the information processing system 10 according to the first example embodiment (hereinafter referred to as a "selection operation" as appropriate) will be described. FIG. 5 is a flowchart illustrating the flow of the selection operation by the information processing system according to the first example embodiment. The selection operation may be started at timing of performing machine learning.

As illustrated in FIG. 5, when the information processing system 10 according to the first example embodiment performs the selection operation, first, the information registered in the registration information database 110 (i.e., the ridge image, the clear zone information, and the unclear zone information) is read (step S101). Then, the zone information extraction unit 120 newly extracts the clear zone information and the unclear zone information from the read ridge image (step S102).

Subsequently, the score calculation unit 130 calculates the first score on the basis of the clear zone information and the unclear zone information registered in the registration information database 110 (i.e., the registration zone information), and calculates the second score on the basis of the clear zone information and the unclear zone information extracted by the zone information extraction unit 120 (i.e., the extraction zone information) (step S103).

Subsequently, on the basis of the first score and the second score calculated in the score calculation unit 130, the ridge image to be used to learn the zone information extraction unit 120 is selected (step S104). A series of operations described above may be performed on all of the ridge images registered in the registration information database 110. The series of operations described above, however, may be performed only on a part of the ridge images registered in the registration information database 110. That is, not all the registered ridge images may be set as a selection target by the selection operation. Thus, the operation when only a part of the ridge images is set as the target will be described in detail in another example embodiments later.

(Technical Effect)

Next, a technical effect obtained by the information processing system 10 according to the first example embodiment will be described.

As described in FIG. 1 to FIG. 5, in the information processing system 10 according to the first example embodiment, the ridge image to be used for machine learning is selected on the basis of the first score calculated from the clear zone information and the unclear zone information stored in association with the ridge image (the registration zone information), and the second score calculated from the extracted clear zone information and unclear zone information (the extraction zone information). In this way, it is possible to select the ridge image suitable for learning and to perform more appropriate machine learning. For example, a ridge image with a big difference between the first score and the second score, can be determined to be significantly corrected by a human hand. By using such a ridge image, it is possible to realize more appropriate machine learning, as compared with a case where a ridge image without correction by a human hand (or a ridge image with a few correction spots) is used.

Second Example Embodiment

The information processing system 10 according to a second example embodiment will be described with reference to FIG. 6A to FIG. 7B. The second example embodiment shows a specific example of the score calculation method in the score calculation unit 130, and the system configuration and the overall operation flow may be the same as those in the first example embodiment. For this reason, a part that is different from the first example embodiment described above will be described in detail below, and a description of other overlapping parts will be omitted as appropriate.

(Edge Count)

Figure 6A:
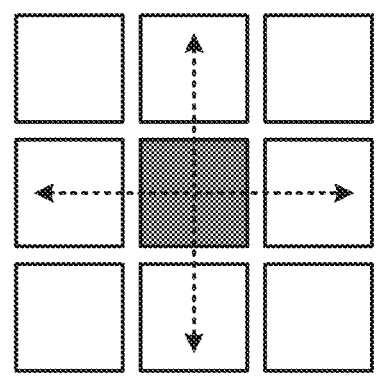
FIG. 6A and FIG. 6B are conceptual diagrams illustrating an example of a score calculation method (edge count) by an information processing system according to a second example embodiment.
Figure 6B:
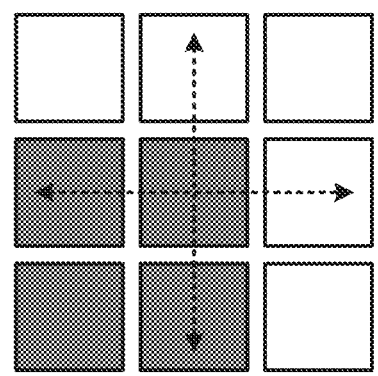

First, a score calculation method by the information processing system 10 according to the second example embodiment will be described with reference to FIG. 6A to FIG. 7B. FIG. 6A and FIG. 6B are conceptual diagrams illustrating an example of the score calculation method (edge count) by the information processing system according to the second example embodiment. FIG. 7A and FIG. 7B are plan views illustrating a score calculation example by the information processing system according to the second example embodiment.

In FIG. 6A and FIG. 6B, in the information processing system 10 according to the second example embodiment, the score calculation unit 130 calculates the first score and the second score (hereinafter sometimes simply referred to as a "score") by using an algorithm called edge count. In this example embodiment, it is assumed that the clear zone and the unclear zone are set for each pixel.

The score calculation unit 130 calculates the score in accordance with how many pixels that are the unclear zone, are around a pixel that is the clear zone. For example, in the example illustrated in FIG. 6A, out of four pixels located on the top, bottom, left, and right of a center pixel that is the clear zone, all the four pixels are the unclear zones. Thus, in a case where there are four surrounding pixels that are the unclear zones, the score calculation unit 130 calculates that the score is "4." In the example illustrated in FIG. 6B, out of the four pixels located on the top, bottom, left, and right of the center pixel that is the clear zone, two pixels on the top and right are the unclear zones (pixels on the left and bottom are the clear zones). Thus, in a case where there are two surrounding pixels that are the unclear zones, the score calculation unit 130 calculates that the score is "2."

In the above-described example, the four pixels on the top, bottom, left, and right based on the center clear zone are used for score calculation, but which pixel is set as the surrounding pixel, is not particularly limited. For example, the score calculation unit 130 may use 8 surrounding pixels (i.e., on the top, bottom, left, right, top right, bottom right, top left, and bottom left) may be used for score calculation.

As illustrated in FIG. 7A and FIG. 7B. 7, the score calculation unit 130 may sum up the scores calculated for all the pixels that are the clear zones in the ridge image, thereby to provide a final score of the ridge image. For example, from the zone information extracted by the zone information extraction unit 120 illustrated in FIG. 7A, a score "3229" is calculated. On the other hand, from the zone information after the correction work illustrated in FIG. 7B, a score "2776" is calculated. As described above, the score calculated by edge count tends to be small because the correction by a human hand is performed. It indicates that as the value of the score calculated by edge count is smaller, the correction is more performed. Therefore, when the correction is performed many times by a human hand, the difference between the first score and the second score is increased.

In the above-described example, the final score is calculated by summing up the scores of all the pixels, but the final score may be calculated by using another technique/method. For example, the score calculation unit 130 may use a mean/average value of the scores of respective pixels as the final score. Alternatively, the score calculation unit 130 may weight each pixel and may add the scores, thereby to calculate the final score.

(Technical Effect)

Next, a technical effect obtained by the information processing system 10 according to the second example embodiment will be described.

As described in FIG. 6A to FIG. 7B, in the information processing system 10 according to the second example embodiment, the first score and the second score are calculated by using edge count. In this way, it is possible to easily and accurately calculate the score of the ridge image. Therefore, it is possible to properly select the ridge image suitable for learning.

Third Example Embodiment

The information processing system 10 according to a third example embodiment will be described with reference to FIG. 8A to FIG. 9B. In addition, as in the second example embodiment described above, the third example embodiment shows a specific example of the score calculation method in the score calculation unit 130, and the system configuration and the overall operation flow may be the same as those in the first example embodiment. For this reason, a part that is different from each of the first and second example embodiments described above will be described in detail below, and a description of other overlapping parts will be omitted as appropriate.

(Island Count)

Figure 8A:
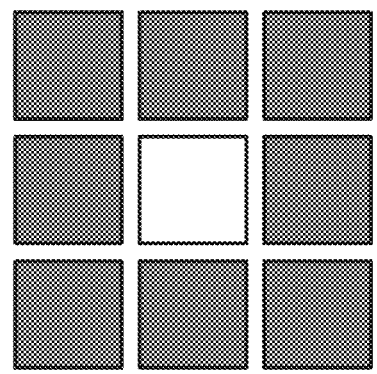
FIG. 8A and FIG. 8B are conceptual diagrams illustrating an example of a score calculation method (island count) by an information processing system according to a third example embodiment.
Figure 8B:
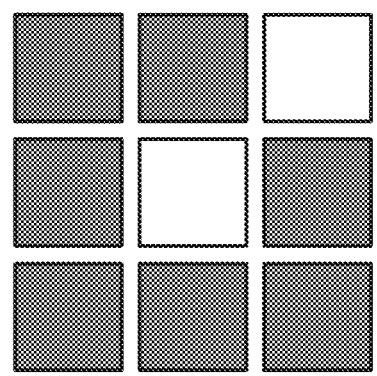

First, a score calculation method by the information processing system 10 according to the third example embodiment will be described with reference to FIG. 8A to FIG. 9B. FIG. 8A and FIG. 8B are conceptual diagrams illustrating an example of the score calculation method (island count) by the information processing system according to the third example embodiment. FIG. 9A and FIG. 9B are plan views illustrating a score calculation example by the information processing system according to the third example embodiment.

In FIG. 8A and FIG. 8B, in the information processing system 10 according to the second example embodiment, the score calculation unit 130 calculates the first score and the second score by using an algorithm called island count.

The score calculation unit 130 calculates the score on the basis of the number of the unclear zones surrounded by the clear zones. For example, in the example illustrated in FIG. 8A, a center pixel that is the unclear zone is surrounded by pixels that are the clear zones. Specifically, 8 surrounding pixels of the center pixel that is the unclear zone (i.e., on the top, bottom, left, right, top right, bottom right, top left, and bottom left) are all the clear zones. In this instance, the score calculation unit 130 counts the center unclear zone, as one island. On the other hand, in the example embodiment illustrated in FIG. 8B, the center pixel that is the unclear zone is surrounded by pixels that are the clear zones, but a part of them is the unclear zone. Specifically, out of the 8 surrounding pixels of the center pixel that is the unclear zone (i.e., on the top, bottom, left, right, top right, bottom right, top left, and bottom left), the pixels other than the top right are the clear zones, but only the pixel on the top right is the unclear zone. In this instance, the score calculation unit 130 does not count the center unclear zone, as one island.

The above-described example describes a case where the surrounded center unclear zone is one pixel, but the surrounded unclear zone may include a plurality of pixels. For example, in a case where two unclear zones adjacent to each other are surrounded by all the clear zones, the two unclear zones may be counted as one island.

As illustrated in FIG. 9A and FIG. 9B, the score calculation unit 130 may calculate the number of islands counted in the image, as the score. For example, there are two islands in the zone information extracted by the zone information extraction unit 120 illustrated in FIG. 9A. Therefore, the score in this case is calculated as "2". On the other hand, there is no island in the zone information after the correction work illustrated in FIG. 9B. Therefore, the score in this case is calculated as "0". As described above, the correction by a human hand may reduce the score calculated by island count. It indicates that as the value of the score calculated by island count is smaller, the correction is more performed. Therefore, when the correction is performed many times by a human hand, the difference between the first score and the second score is increased.

(Technical Effect)

Next, a technical effect obtained by the information processing system 10 according to the third example embodiment will be described.

As described in FIG. 8A to FIG. 9B, in the information processing system 10 according to the third example embodiment, the first score and the second score are calculated by using island count. In this way, it is possible to easily and accurately calculate the score of the ridge image. Therefore, it is possible to properly select the ridge image suitable for learning.

Fourth Example Embodiment

The information processing system 10 according to a fourth example embodiment will be described with reference to FIG. 10. In addition, as in the second and third example embodiments described above, the fourth example embodiment shows a specific example of the score calculation method in the score calculation unit 130, and the system configuration and the overall operation flow may be the same as those in the first example embodiment. For this reason, a part that is different from each of the first to third example embodiments described above will be described in detail below, and a description of other overlapping parts will be omitted as appropriate.

(Binary Smooth Difference Evaluation Algorithm)

First, a score calculation method by an information processing system 10 according to a fourth example embodiment will be described with reference to FIG. 10. FIG. 10 is a conceptual diagram illustrating an example of the score calculation method (a binary smooth difference evaluation algorithm) by the information processing system according to the fourth example embodiment.

Figure 10:
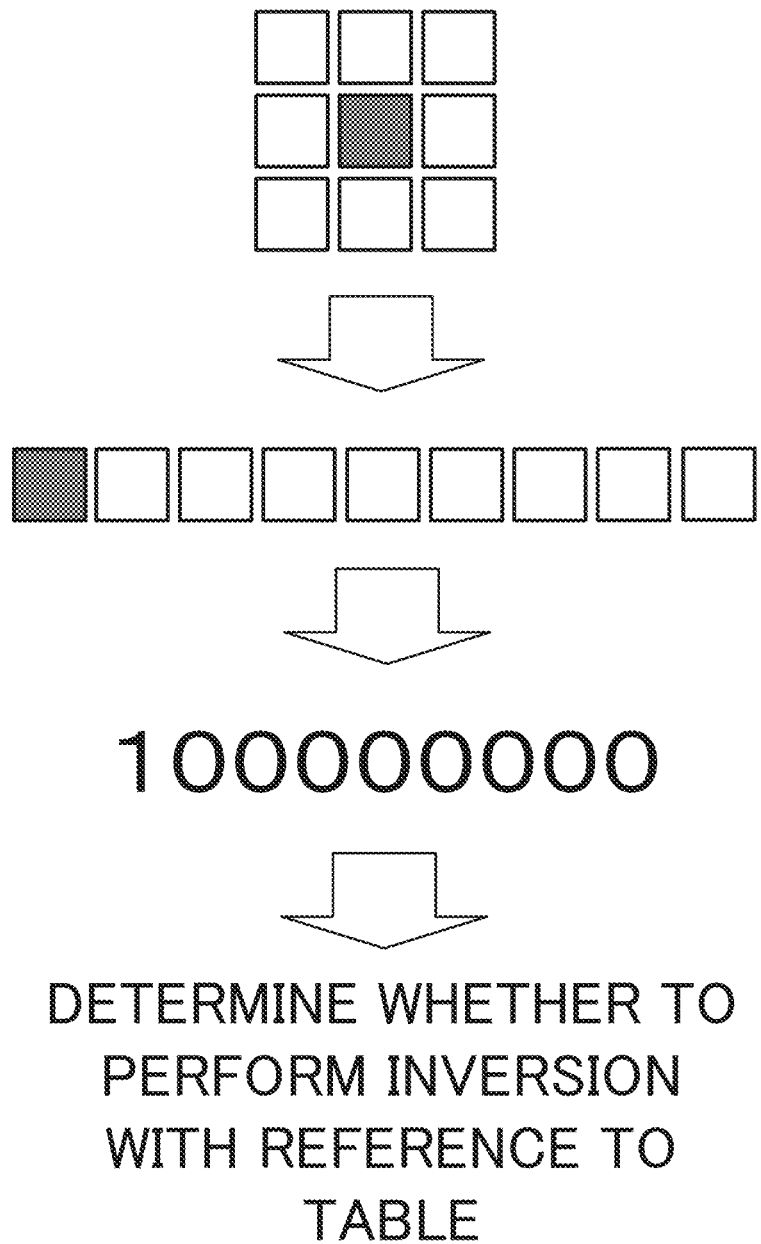
FIG. 10 is a conceptual diagram illustrating an example of a score calculation method (a binary smooth difference evaluation algorithm) by an information processing system according to a fourth example embodiment.

In FIG. 10, in the information processing system 10 according to the fourth example embodiment, the score calculation unit 130 calculates the first score and the second score by using the binary smooth difference evaluation algorithm (hereinafter referred to as "binary smooth" as appropriate).

The score calculation unit 130 first arranges nine pixels of the ridge image laterally in a row, and converts them into a bit string of "0" and "1". The score calculation unit 130 converts the clear zone to "1" and the unclear zone to "0", respectively, for example. In the example illustrated in FIG. 10, since one pixel at the left end is the clear zone and the others are the unclear zones, the bit string is "1,0,0,0,0,0,0, 0,0." Then, the score calculation unit 130 compares this bit string with a table stored in advance, and determines whether or not to invert one pixel in the center. That is, the score calculation unit 130 determines whether or not to invert the center clear zone located in the center of the nine pixels into the unclear zone. In the table, for example, the value of "1" or "0" is stored (i.e., whether or not to perform inversion is stored) for each of 256 values that can be taken by the bit string.

As a consequence of the above process, when the clear zone and the unclear zone are inverted, the score calculation unit 130 counts the pixel as a pixel to be inverted. On the other hand, when the clear zone and the unclear zone are not inverted, the score calculation unit 130 does not count the pixel as the pixel to be inverted. Then, the score calculation unit 130 counts the pixels to be inverted for all the pixels included in the ridge image, and calculates a total number of them as the score. This score is a value indicating distortion/ irregularity of the shape of the clear zone and the unclear zone, and is a larger value as the shape of the zone is more distorted, for example. Especially here, in the zone information after the correction work, there is less distortion/ irregularity than that before the correction work, and the score calculated as described above is reduced. It indicates that as the value of the score calculated by binary smooth is smaller, the correction is more performed. Therefore, when the correction is performed many times by a human hand, the difference between the first score and the second score is increased.

(Technical Effect)

Next, a technical effect obtained by the information processing system 10 according to the fourth example embodiment will be described.

As described in FIG. 10, in the information processing system 10 according to the fourth example embodiment, the first score and the second score are calculated by using the binary smooth difference evaluation algorithm. In this way, it is possible to easily and accurately calculate the score of the ridge image. Therefore, it is possible to properly select the ridge image suitable for learning.

All the algorithms described in the second to fourth example embodiments (i.e., edge count, island count, and binary smooth difference evaluation algorithm) may be kept available, and one appropriate algorithm of them may be selected and used as appropriate. Furthermore, a plurality of algorithms may be combined and used. For example, the ridge image to be used for machine learning may be selected by using an integrated score obtained by integrating the scores calculated by the plurality of algorithms.

Fifth Example Embodiment

The information processing system 10 according to a fifth example embodiment will be described with reference to FIG. 11. The fifth example embodiment is partially different from the first to fourth example embodiments only in the configuration and operation, and may be the same as the first to fourth example embodiments in the other parts. For this reason, a part that is different from each of the example embodiments described above will be described in detail below, and a description of other overlapping parts will be omitted as appropriate.

(Functional Configuration)

First, a functional configuration of the information processing system 10 according to the fifth example embodiment will be described with reference to FIG. 11. FIG. 11 is a block diagram illustrating the functional configuration of the information processing system according to the fifth example embodiment. In FIG. 11, the same components as those illustrated in FIG. 2 carry the same reference numerals.

Figure 11:
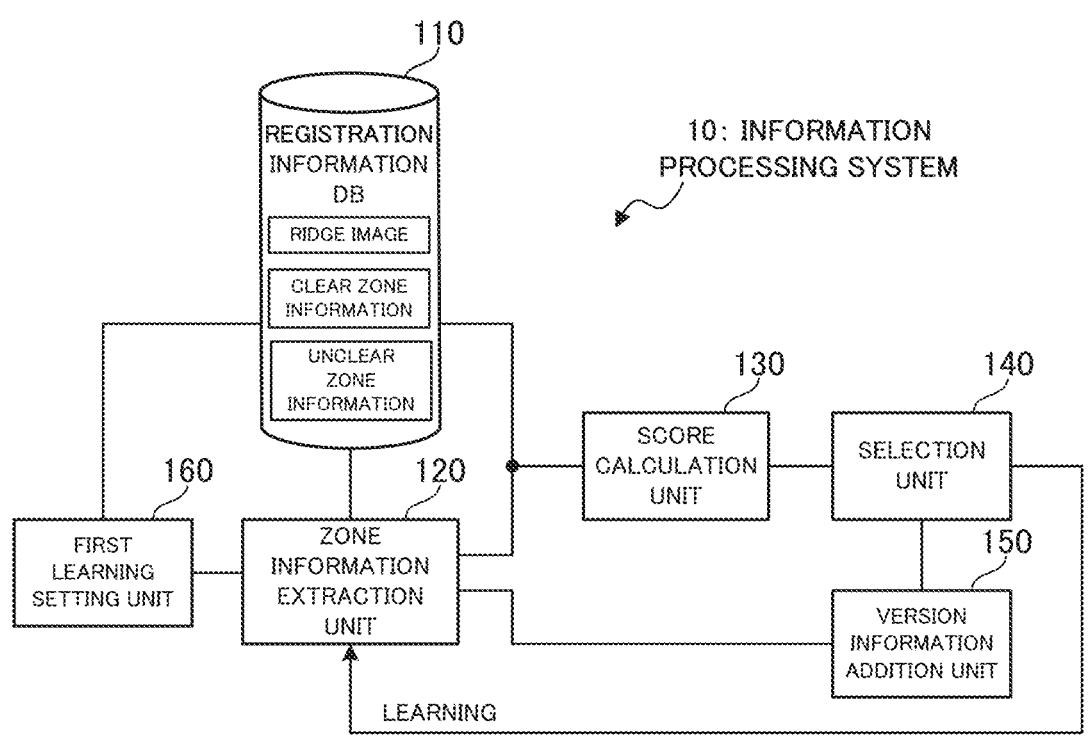
FIG. 11 is a block diagram illustrating a functional configuration of an information processing system according to a fifth example embodiment.

As illustrated in FIG. 11, the information processing system 10 according to the fifth example embodiment includes, as components for realizing the functions thereof, the registration information database 110, the zone information extraction unit 120, the score calculation unit 130, the selection unit 140, a version information addition unit 150, and a first learning setting unit 160. That is, the information processing system 10 according to the fifth example embodiment further includes the version information addition unit 150 and the first learning setting unit 160, in addition to the configuration in the first example embodiment (see FIG. 2). Each of the version information addition unit 150 and the first learning setting unit 160 may be a processing block realized or implemented by the processor 11 (see FIG. 1).

The version information addition unit 150 is configured to add version information indicating a version of the zone information extraction unit 120. The version of the zone information extraction unit 120 is updated at each time of machine learning, and it is possible to identify the ridge image already used in machine learning, from the current version information. For example, the version information addition unit 150 associates the ridge image selected by the selection unit 140 (i.e., the image to be used for machine learning) with the version information added after machine learning using the image. Furthermore, the version information may be associated with the ridge image used in previous machine learning (e.g., machine learning two times before, or machine learning three times before). This makes it possible to identify the ridge image already used for machine learning, from the current version information.

The first learning setting unit 160 is configured to make setting such that the ridge image already used for machine learning is not used for subsequent machine learning, on the basis of the version information. The first learning setting unit 160 acquires the current version information from the zone information extraction unit 120, for example. It then outputs information about the ridge image identified from the version information, to the registration information database 110. The registration information database 110 prevents the ridge image identified from the version information (i.e., the ridge image already used for machine learning) from being outputted as a next selection candidate, for example. That is, the score is not calculated for the ridge image identified from the version information.

(Technical Effect)

Next, a technical effect obtained by the information processing system 10 according to the fifth example embodiment will be described.

As described in FIG. 11, in the information processing system 10 according to the fifth example embodiment, the ridge image already used for machine learning is not used in the subsequent machine learning. In this way, it is possible to prevent that the same image is used for machine learning many times, thereby to realize more efficient machine learning. In addition, since the number of the images used to calculate the score can be reduced, a processing load of the selection operation may also be reduced.

Sixth Example Embodiment

The information processing system 10 according to a sixth example embodiment will be described with reference to FIG. 12. The sixth example embodiment is partially different from the first to fifth example embodiment only in the configuration and operation, and may be the same as the first to fifth example embodiments in the other parts. For this reason, a part that is different from each of the example embodiments described above will be described in detail below, and a description of other overlapping parts will be omitted as appropriate.

(Functional Configuration)

First, a functional configuration of the information processing system 10 according to the sixth example embodiment will be described with reference to FIG. 12. FIG. 12 is a block diagram illustrating the functional configuration of the information processing system according to the sixth example embodiment. In FIG. 12, the same components as those illustrated in FIG. 2 carry the same reference numerals.

Figure 12:
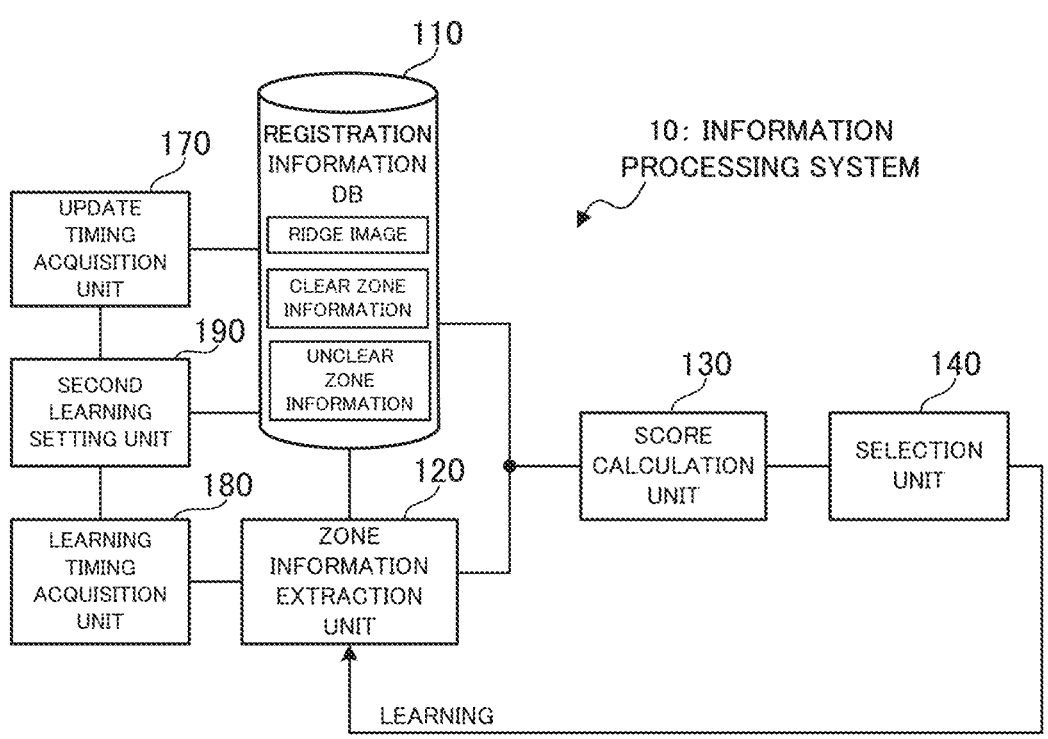
FIG. 12 is a block diagram illustrating a functional configuration of an information processing system according to a sixth example embodiment.

As illustrated in FIG. 12, the information processing system 10 according to the sixth example embodiment includes, as components for realizing the functions thereof, the registration information database 110, the zone information extraction unit 120, the score calculation unit 130, the selection unit 140, an update timing acquisition unit 170, a learning timing acquisition unit 180, and a second learning setting unit 190. That is, the information processing system 10 according to the sixth example embodiment further includes the update timing acquisition unit 170, the learning timing acquisition unit 180, and the second learning setting unit 190, in addition to the configuration in the first example embodiment (see FIG. 2). Each of the update timing acquisition unit 170, the learning timing acquisition unit 180, and the second learning setting unit 190 may be a processing block realized or implemented by the processor 11 (see FIG. 1), for example.

The update timing acquisition unit 170 is configured to acquire information indicating update timing when the clear zone information and the unclear zone information stored in the registration information database 110 (i.e., the registration zone information) are updated. The update timing may be acquired as information indicating date and time, for example. The update timing information may be, for example, information indicating timing when one of the clear zone information and the unclear zone information is updated, or information indicating timing when both the clear zone information and the unclear zone information are updated.

The learning timing acquisition unit 180 is configured to acquire information indicating timing when the learning of the zone information extraction unit 120 is performed. The learning timing may be acquired as information indicating date and time, for example. As in the fifth example embodiment, in a case where the version information addition unit 150 is provided (i.e., in a case where the version of the zone information extraction unit 120 is updated at each time of machine learning), the learning timing acquisition unit 180 may acquire the information about the learning timing, from the version information.

The second learning setting unit 190 makes setting such that the ridge image in which the update timing is after the learning timing, is used for the subsequent machine learning. For example, the second learning setting unit 190 instructs the registration information database 110 to output the ridge image in which the update timing is after the learning timing, as the next selection candidate. Therefore, for the ridge image in which the update timing is after the learning timing, the first score and the second score are calculated when the machine learning is performed, and the selection according to those scores is performed. The second learning setting unit 190 may make setting such that the ridge image in which the update timing is before the learning timing, is not used for the subsequent machine learning.

(Technical Effect)

Next, a technical effect obtained by the information processing system 10 according to the sixth example embodiment will be described.

As described in FIG. 12, in the information processing system 10 according to the sixth example embodiment, the ridge image in which the update timing is after the learning timing, is used for the subsequent machine learning. In this way, it is possible to perform appropriate machine learning by using the ridge image in which the registration zone information is newly updated. For example, even the ridge image that is already used for machine learning, but in which the clear zone information and the unclear zone information are updated after machine learning, is used for machine learning in accordance with the score. Therefore, it is possible to reflect the updated unclear zone information and unclear zone information in the learning.

Seventh Example Embodiment

The information processing system 10 according to a seventh example embodiment will be described with reference to FIG. 13 and FIG. 14. The seventh example embodiment is partially different from the first to sixth example embodiments only in the configuration and operation, and may be the same as the first to sixth example embodiments in the other parts. For this reason, a part that is different from each of the example embodiments described above will be described in detail below, and a description of other overlapping parts will be omitted as appropriate.

(Functional Configuration)

First, a functional configuration of the information processing system 10 according to the seventh example embodiment will be described with reference to FIG. 13. FIG. 13 is a block diagram illustrating the functional configuration of the information processing system according to the seventh example embodiment. In FIG. 13, the same components as those illustrated in FIG. 2 carry the same reference numerals.

Figure 13:
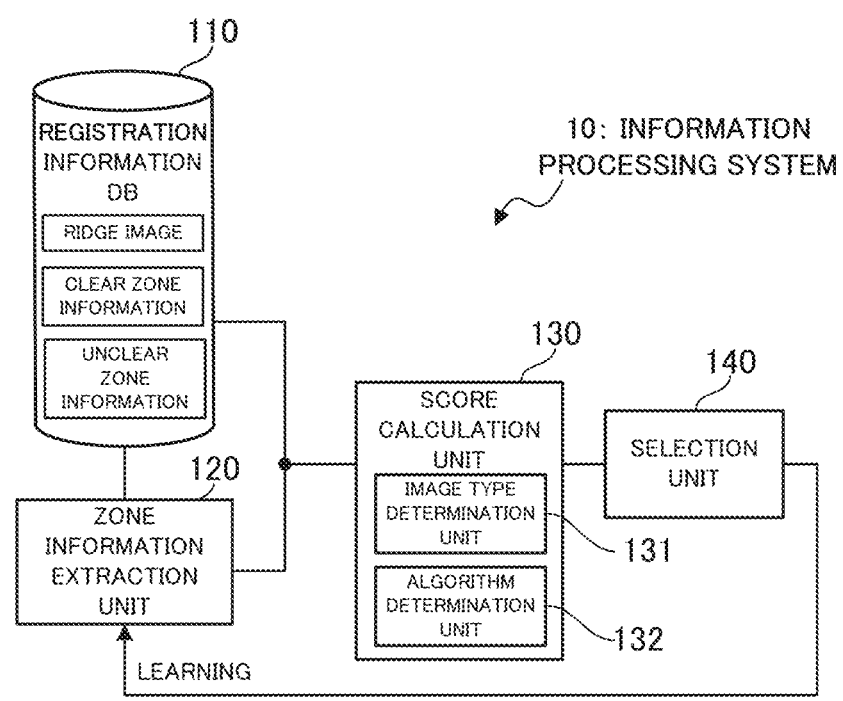
FIG. 13 is a block diagram illustrating a functional configuration of an information processing system according to a seventh example embodiment.

As illustrated in FIG. 13, the information processing system 10 according to the seventh example embodiment includes, as components for realizing the functions thereof, the registration information database 110, the zone information extraction unit 120, the score calculation unit 130, and the selection unit 140. In particular, the score calculation unit 130 according to the seventh example embodiment includes an image type determination unit 131 and an algorithm determination unit 132. The score calculation unit 130 according to the seventh example embodiment is configured to calculate the first score and the second score by using a plurality of algorithms. For example, the score calculation unit 130 is configured to calculate the score by using the algorithms described in the second to fourth example embodiments (i.e., edge count, island count, and binary smooth difference evaluation algorithm).

The image type determination unit 131 is configured to determine a type of the ridge image for calculating the score. The image type determination unit 131 may be configured to determine whether the ridge image is a fingerprint image or a palm print image, for example. A method of determining the image type is not particularly limited, and the determination may be performed employing an existing technique/technology as appropriate. A determination result of the image type determination unit 131 is configured to be outputted to the algorithm determination unit 132.

The algorithm determination unit 132 is configured to change the algorithm to be used for score calculation, in accordance with the determination result of the image type determination unit 131. That is, the algorithm determination unit 132 is configured to select the algorithm to be actually used for score calculation in accordance with the image type, from among a plurality of algorithms that can be used for score calculation. Alternatively, the algorithm determination unit 132 may be configured to change the weight of the algorithm to be used for score calculation, in accordance with the determination result of the image type determination unit 131. That is, the algorithm determination unit 132 may set the respective weights of the plurality of algorithms to be used for score calculation, in accordance with the image type, and may change the effect of each of the algorithms on the final score.

(Operation Example)

Next, an operation example of the information processing system 10 according to the seventh example embodiment (specifically, an operation example of the algorithm determination unit 132) will be described with reference to FIG. 14. FIG. 14 is a table illustrating the operation example of the information processing system according to the seventh example embodiment.

As illustrated in FIG. 14, the algorithm determination unit 132 may change the algorithm to be used, depending on whether the ridge image is a fingerprint image or a palm print image. For example, when the ridge image is a fingerprint image, the algorithmic determination unit 132 may determine to calculate the score by using at least one of edge count and island count. On the other hand, when the ridge image is a palm print image, the algorithm determination unit 132 may determine to calculate the score by using the binary smooth difference evaluation algorithm.

Here, since the palm print image has a bigger image size than the fingerprint image does, there are many large wrinkles (lines of palm) in the image. Then, for such an area that there are many such wrinkles, the zone information extraction unit 120 tends to set the clear zone, and the worker who performs the correction work tends to set the unclear zone. In this instance, when the zone information extraction unit 120 sets the clear zone, an edge is reduced, and when the worker sets the unclear zone, the edge is increased. Thus, when edge count and island count are applied, there is a possibility that an appropriate score may not be acquired. Therefore, it can be said for the palm print image that it is preferable to calculate the score by using the binary smooth difference estimation algorithm. On the other hand, it can be said for the fingerprint image that it is preferable to calculate the score by using edge count and island count, as opposed to the palm print image.

The algorithm determination unit 132 may change the weight that is set for each algorithm, depending on whether the ridge image is a fingerprint image or a palm print image. For example, when the ridge image is a fingerprint image, the algorithmic determination unit 132 may increase the weight of at least one of edge count and island count. Alternatively, when the ridge image is a fingerprint image, the algorithm determination unit 132 may reduce the weight of the binary smooth difference evaluation algorithm. Alternatively, when the ridge image is a fingerprint image, the algorithm determination unit 132 may increase the weight of at least one of edge count and island count, while reducing the weight of the binary smooth difference evaluation algorithm. In this way, the effect of edge count and island count is relatively increased for the fingerprint image, while the effect of the binary smooth difference estimation algorithm is relatively reduced. Therefore, for the reasons described above, it is possible to perform the score calculation by a technique/method suitable for the fingerprint image.

On the other hand, when the ridge image is a palm print image, the algorithm determination unit 132 may increase the weight of the binary smooth difference evaluation algorithm. Alternatively, when the ridge image is a palm print image, the algorithmic determination unit 132 may reduce the weight of at least one of edge count and island count. Alternatively, when the ridge image is a palm print image, the algorithm determination unit 132 may increase the weight of the binary smooth difference evaluation algorithm, while reducing the weight of at least one of edge count and island count. In this way, for the palm print image, the effect of edge count and island count is relatively reduced, while the effect of the binary smooth difference estimation algorithm is relatively increased. Therefore, for the reasons described above, it is possible to perform the score calculation by a technique/method suitable for the palm print image.

(Technical Effect)

Next, a technical effect obtained by the information processing system 10 according to the seventh example embodiment will be described.

As described in FIG. 13 and FIG. 14, in the information processing system 10 according to the seventh example embodiment, the algorithm to be used for score calculation, or the weight of each algorithm, is changed in accordance with the image type. In this way, it is possible to calculate an appropriate score by the method/technique according to the image type. Consequently, it is possible to select the ridge image suitable for machine learning.

A processing method that is executed on a computer by recording, on a recording medium, a program for allowing the configuration in each of the example embodiments to operate so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

Supplementary Notes

The example embodiments described above may be further described as, but not limited to, the following Supplementary Notes below.

Supplementary Note 1

An information processing system according to Supplementary Note 1 is an information processing system including: a storage unit that stores first area information indicating a clear zone in which a feature quantity of a ridge in a ridge image can be extracted, and second area information indicating an unclear zone that is an area other than the clear zone, in association with each of a plurality of ridge images; an extraction unit that extracts third area information indicating the clear zone, and fourth area information indicating the unclear zone, from the ridge image; a calculation unit that calculates a first score based on the first area information and the second area information, and a second score based on the third area information and the fourth area information; and a selection unit that selects the ridge image to be used for machine learning of the extraction unit, on the basis of the first score and the second score.

Supplementary Note 2

An information processing system according to Supplementary Note 2 is the information processing system according to Supplementary Note 1, wherein the clear zone and the unclear zone are set for each pixel of the ridge image, and the calculation unit calculates the first score and the second score on the basis of a number of pixels that are the unclear zones adjacent to a pixel that is the clear zone.

Supplementary Note 3

An information processing system according to Supplementary Note 3 is the information processing system according to Supplementary Note 1 or 2, wherein the calculation unit calculates the first score and the second score on the basis of a number of the unclear zones surrounded by the clear zones.

Supplementary Note 4

An information processing system according to Supplementary Note 4 is the information processing system according to any one of Supplementary Notes 1 to 3, wherein the calculation unit calculates the first score and the second score, on the basis of a number of spots where the clear zone and the unclear zone are inverted, when performing a binary smooth process on the first area information and the second area information, and on the third area information and the fourth area information.

Supplementary Note 5

An information processing system according to Supplementary Note 5 is the information processing system according to any one of Supplementary Notes 1 to 4, further including: an addition unit that adds version information that allows identification of the ridge image already used in machine learning, to the extraction unit on which machine learning is performed; and a first setting unit that makes setting such that the ridge image already used for machine learning is not used for subsequent machine learning, on the basis of the version information.

Supplementary Note 6

An information processing system according to Supplementary Note 6 is the information processing system according to any one of Supplementary Notes 1 to 5, further including: a first acquisition unit that acquires update timing when the first area information and the second area information stored in the storage unit are updated; a second acquisition unit that acquires learning timing when previous machine learning is performed on the extraction unit; and a second setting unit that makes setting such that the ridge image in which the update timing is after the learning timing, is used for subsequent machine learning.

Supplementary Note 7

An information processing system according to Supplementary Note 7 is the information processing system according to any one of Supplementary Notes 1 to 6, wherein the calculation unit is configured to calculate the first score and the second score by using a plurality of types of algorithms, and selects the algorithm to be used in calculating the first score and the second score, or changes weight that is set for each of the algorithms, depending on which of a fingerprint and a palm print is included by the ridge image.

Supplementary Note 8

An information processing apparatus according to Supplementary Note 8 is an information processing apparatus including: a storage unit that stores first area information indicating a clear zone in which a feature quantity of a ridge in a ridge image can be extracted, and second area information indicating an unclear zone that is an area other than the clear zone, in association with each of a plurality of ridge images; an extraction unit that extracts third area information indicating the clear zone, and fourth area information indicating the unclear zone, from the ridge image; a calculation unit that calculates a first score based on the first area information and the second area information, and a second score based on the third area information and the fourth area information; and a selection unit that selects the ridge image to be used for machine learning of the extraction unit, on the basis of the first score and the second score.

Supplementary Note 9

An information processing method according to Supplementary Note 9 is an information processing method executed by at least one computer, the information processing method including: storing first area information indicating a clear zone in which a feature quantity of a ridge in a ridge image can be extracted, and second area information indicating an unclear zone that is an area other than the clear zone, in association with each of a plurality of ridge images; extracting third area information indicating the clear zone, and fourth area information indicating the unclear zone, from the ridge image; calculating a first score based on the first area information and the second area information, and a second score based on the third area information and the fourth area information; and selecting the ridge image to be used for machine learning of the extraction unit, on the basis of the first score and the second score.

Supplementary Note 10

A recording medium according to Supplementary Note 10 is a recording medium on which a computer program that allows at least one computer to execute an information processing method is recorded, the information processing method including: storing first area information indicating a clear zone in which a feature quantity of a ridge in a ridge image can be extracted, and second area information indicating an unclear zone that is an area other than the clear zone, in association with each of a plurality of ridge images; extracting third area information indicating the clear zone, and fourth area information indicating the unclear zone, from the ridge image; calculating a first score based on the first area information and the second area information, and a second score based on the third area information and the fourth area information; and selecting the ridge image to be used for machine learning of the extraction unit, on the basis of the first score and the second score.

Supplementary Note 11

A computer program according to Supplementary Note 11 is a computer program that allows at least one computer to execute an information processing method, the information processing method including: storing first area information indicating a clear zone in which a feature quantity of a ridge in a ridge image can be extracted, and second area information indicating an unclear zone that is an area other than the clear zone, in association with each of a plurality of ridge images; extracting third area information indicating the clear zone, and fourth area information indicating the unclear zone, from the ridge image; calculating a first score based on the first area information and the second area information, and a second score based on the third area information and the fourth area information; and selecting the ridge image to be used for machine learning of the extraction unit, on the basis of the first score and the second score.

This disclosure is not limited to the examples described above and is allowed to be changed, if desired, without departing from the essence or spirit of this disclosure which can be read from the claims and the entire specification. An information processing system, an information processing apparatus, an information processing method, and a recording medium with such changes are also intended to be within the technical scope of this disclosure.

DESCRIPTION OF REFERENCE CODES

10 Information processing system
11 Processor
14 Storage apparatus
110 Registration information database
120 Zone information extraction unit
130 Score calculation unit
131 Image type determination unit
132 Algorithm determination unit
140 Selection unit
150 Version information addition unit
160 First learning setting unit
170 Update timing acquisition unit
180 Learning timing acquisition unit
190 Second learning setting unit

What is claimed is:

1. An information processing system comprising:
at least one memory that is configured to store instructions; and
at least one processor that is configured to execute the instructions to
first area information indicating a clear zone in which a feature quantity of a ridge in a ridge image can be extracted, and second area information indicating an unclear zone that is an area other than the clear zone, in association with each of a plurality of ridge images;
extract third area information indicating the clear zone, and fourth area information indicating the unclear zone, from the ridge image;
calculate a first score based on the first area information and the second area information, and a second score based on the third area information and the fourth area information; and
select the ridge image to be used for machine learning of the extraction unit, on the basis of the first score and the second score.

2. The information processing system according to claim 1, wherein
the clear zone and the unclear zone are set for each pixel of the ridge image, and
the at least one processor is configured to execute the instructions to calculate the first score and the second score on the basis of a number of pixels that are the unclear zones adjacent to a pixel that is the clear zone.

3. The information processing system according to claim 1, wherein the at least one processor is configured to execute the instructions to calculate the first score and the second score on the basis of a number of the unclear zones surrounded by the clear zones.

4. The information processing system according to claim 1, wherein the at least one processor is configured to execute the instructions to calculate the first score and the second score, on the basis of a number of spots where the clear zone and the unclear zone are inverted, when performing a binary smooth process on the first area information and the second area information, and on the third area information and the fourth area information.

5. The information processing system according to claim 1, wherein the at least one processor is configured to execute the instructions to:
add version information that allows identification of the ridge image already used in machine leaning; and
make setting such that the ridge image already used for machine learning is not used for subsequent machine learning, on the basis of the version information.

6. The information processing system according to claim 1, wherein the at least one processor is configured to execute the instructions to:
acquire update timing when the first area information and the second area information stored are updated;
acquire learning timing when previous machine learning is performed; and
make setting such that the ridge image in which the update timing is after the learning timing, is used for subsequent machine learning.

7. The information processing system according to claim 1, wherein the at least one processor is configured to execute the instructions to: calculate the first score and the second score by using a plurality of types of algorithms, and select the algorithm to be used in calculating the first score and the second score, or change weight that is set for each of the algorithms, depending on which of a fingerprint and a palm print is included by the ridge image.

8. An information processing method executed by at least one computer, the information processing method comprising:
storing first area information indicating a clear zone in which a feature quantity of a ridge in a ridge image can be extracted, and second area information indicating an unclear zone that is an area other than the clear zone, in association with each of a plurality of ridge images;
extracting third area information indicating the clear zone, and fourth area information indicating the unclear zone, from the ridge image;
calculating a first score based on the first area information and the second area information, and a second score based on the third area information and the fourth area information; and
selecting the ridge image to be used for machine learning of the extraction unit, on the basis of the first score and the second score.

9. A non-transitory recording medium on which a computer program that allows at least one computer to execute an information processing method is recorded, the information processing method including:
storing first area information indicating a clear zone in which a feature quantity of a ridge in a ridge image can be extracted, and second area information indicating an unclear zone that is an area other than the clear zone, in association with each of a plurality of ridge images;
extracting third area information indicating the clear zone, and fourth area information indicating the unclear zone, from the ridge image;
calculating a first score based on the first area information and the second area information, and a second score based on the third area information and the fourth area information; and
selecting the ridge image to be used for machine learning of the extraction unit, on the basis of the first score and the second score.

* * * * *